(12) United States Patent
Hsieh et al.

(10) Patent No.: US 11,423,261 B2
(45) Date of Patent: Aug. 23, 2022

(54) ELECTRONIC DEVICE AND MODEL UPDATING METHOD

(71) Applicant: Acer Incorporated, New Taipei (TW)

(72) Inventors: Cheng-Tien Hsieh, New Taipei (TW); Yin-Hsong Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 568 days.

(21) Appl. No.: 16/561,050

(22) Filed: Sep. 5, 2019

(65) Prior Publication Data

US 2020/0349396 A1    Nov. 5, 2020

(30) Foreign Application Priority Data

May 3, 2019  (TW) .................................. 108115365

(51) Int. Cl.
   *G06K 9/62*    (2022.01)
   *G06N 20/00*  (2019.01)

(52) U.S. Cl.
   CPC ........... *G06K 9/6264* (2013.01); *G06K 9/623* (2013.01); *G06K 9/6257* (2013.01); *G06N 20/00* (2019.01)

(58) Field of Classification Search
   CPC .... G06K 9/6264; G06K 9/623; G06K 9/6257; G06N 20/00
   See application file for complete search history.

(56) References Cited

U.S. PATENT DOCUMENTS

| | | | | |
|---|---|---|---|---|
| 8,504,908 | B2 * | 8/2013 | Chisholm | G06F 16/313 |
| | | | | 715/230 |
| 8,762,298 | B1 * | 6/2014 | Ranjan | G06F 21/552 |
| | | | | 706/12 |
| 9,063,975 | B2 * | 6/2015 | Isensee | G06F 16/248 |
| 9,280,908 | B2 * | 3/2016 | Isensee | G09B 7/02 |
| 10,451,712 | B1 * | 10/2019 | Madhow | G01S 13/723 |
| 10,565,703 | B2 * | 2/2020 | Kobayashi | G06T 7/001 |
| 10,755,411 | B2 * | 8/2020 | Zhang | G06T 7/0012 |
| 10,832,083 | B1 * | 11/2020 | Givental | G06V 10/82 |
| 2009/0281972 | A1 | 11/2009 | Shahani et al. | |
| 2011/0022941 | A1 * | 1/2011 | Osborne | G06F 16/367 |
| | | | | 715/230 |

(Continued)

FOREIGN PATENT DOCUMENTS

| | | |
|---|---|---|
| CN | 101339619 | 1/2009 |
| CN | 104398254 | 3/2015 |

(Continued)

*Primary Examiner* — Manav Seth
(74) *Attorney, Agent, or Firm* — JCIPRNET

(57) ABSTRACT

An electronic device and a model updating method are provided. The method includes: inputting a plurality of files to a first model and outputting a predicted result of each of the plurality of files; receiving a corrected result for correcting the prediction result of at least one first file in the plurality of files, and generating a first label file corresponding to the at least one first file according to the corrected result and the first file; training a plurality of models according to the first label file to generate a plurality of a trained model; testing the plurality of trained models using at least one test set; and replacing the first model with a first trained model when the predicting accuracy of the first trained model of the plurality of trained models is higher than the predicting accuracy of the first model.

10 Claims, 9 Drawing Sheets

(56) References Cited

U.S. PATENT DOCUMENTS

| | | | |
|---|---|---|---|
| 2015/0269195 A1* | 9/2015 | Aisu | G06N 20/00 |
| | | | 706/12 |
| 2019/0179883 A1* | 6/2019 | Bao | G06F 40/284 |
| 2019/0251251 A1* | 8/2019 | Carson | G06F 21/51 |
| 2020/0134504 A1* | 4/2020 | Li | H04L 63/1425 |
| 2020/0327380 A1* | 10/2020 | Fukuda | G06K 9/6263 |
| 2021/0090694 A1* | 3/2021 | Colley | G16B 40/00 |
| 2021/0272288 A1* | 9/2021 | Takahashi | G06V 10/82 |
| 2022/0019860 A1* | 1/2022 | Weese | G06K 9/6263 |
| 2022/0147714 A1* | 5/2022 | Reyderman | G06F 40/205 |

FOREIGN PATENT DOCUMENTS

| | | | |
|---|---|---|---|
| TW | 201211789 | 3/2012 | |
| WO | WO-2019204824 A1 * | 10/2019 | G06K 9/00362 |

* cited by examiner

ELECTRONIC DEVICE AND MODEL UPDATING METHOD

CROSS-REFERENCE TO RELATED APPLICATION

This application claims the priority benefit of Taiwan application serial no. 108115365, filed on May 3, 2019. The entirety of the above-mentioned patent application is hereby incorporated by reference herein and made a part of this specification.

BACKGROUND OF THE INVENTION

1. Field of the Invention

The present invention relates to an electronic device and a model updating method.

2. Description of Related Art

With the advancement of smart medical treatment, it will become more and more common to use artificial intelligence, machine learning models or deep learning models to aid medical diagnosis. However, there are often gray areas in terms of many medical symptoms, and judgments often vary from person to person. Therefore, it is actually a difficult task to apply only one set of rules to all hospitals.

The existing model-based machine learning or deep learning means that a highly parametric model is established, and a large number of parameters in a labeled data trained model are adopted, so that the model containing the trained parameters can be used for predicting new data. The process of training the model can sequentially include: collecting de-identified data, labeling the data, pre-processing and enhancing the data, designing the model, and inputting the labeled data to the model for model training. The flow of labeling the data is extremely time-consuming, and the purpose of model training is to find the labeling rules so that the results predicted by the model in the future will be close to the rules.

Taking the medical industry as an example, if we ask a doctor of hospital A to help labeling the data, the prediction on the new data by the trained model will be close to the prediction of the doctor in the hospital A. If we popularize this model to hospital B, and the hospital B has different judgment criteria, they may think that the judgment of the system is poor, which will affect their willingness to use the system.

SUMMARY OF THE INVENTION

Therefore, the present invention is directed to an electronic device and a model updating method, which self-adjust or train a model when the prediction of a model does not meet the expectation so as to enable the predicted behavior of the model to approach the expectation of a user, thereby increasing the willingness of a user to accept the used model (or system).

The present invention is directed to an electronic device, comprising a storage circuit and a processor. The storage circuit records a plurality of modules. The processor accesses and executes the plurality of modules, and the plurality of modules comprises: a prediction module, an intelligent labeling module, an automatic training module, a model evolution decision module, and an automatic process management and control module. The prediction module inputs a plurality of files to a first model and outputs a predicted result of each of the plurality of files. The intelligent labeling module receives a corrected result for correcting the predicted result of at least one first file in the plurality of files, and generates a first label file corresponding to the first file according to the corrected result and the first file. The automatic training module trains a plurality of models according to the first label file to generate a plurality of trained models. The model evolution decision module tests the plurality of trained models by using at least one test set. The automatic process management and control module replaces the first model with a first trained model when the predicting accuracy of the first trained model in the plurality of trained models is higher than the predicting accuracy of the first model.

The present invention is directed to a model updating method for an electronic device, comprising: inputting a plurality of files to a first model and outputting a predicted result of each of the plurality of files; receiving a corrected result for correcting the predicted result of at least one first file in the plurality of files, and generating a first label file corresponding to the first file according to the corrected result and the first file; training a plurality of models according to the first label file to generate a plurality of trained models; testing the plurality of trained models by using at least one test set; and replacing the first model with a first trained model when the predicting accuracy of the first trained model in the plurality of trained models is higher than the predicting accuracy of the first model.

Based on the above, the present invention is directed to an electronic device and a model updating method, which self-adjust or train a model when the prediction of the model does not meet the expectation so as to enable the predicted behavior of the model to approach the expectation to be achieved, thereby increasing the willingness of a user to accept the used model (or system). On the other hand, if the user thinks that the predicted effect of the original model or system is good, or if the predicted effect of the model or system does not change with time, the user is allowed to turn off the update of the model. In addition, if some predicted behaviors are divided into a plurality of steps and the steps are combined by respectively using a plurality of models, respective models are also learned and trained respectively. The user selects part of the models for self-training. In addition, in the model updating method of the present invention, the training time of the model is also scheduled, thereby avoiding the time for the user (for example, a doctor) to use the system, and performing self-training of the model during the non-business time (for example, at night or when the doctor is absent). Therefore, the model updating method of the present invention not only joins the mechanism of self-learning of the model, but also comprises user management and control and scheduling.

In order to make the aforementioned and other objectives and advantages of the present invention comprehensible, embodiments accompanied with figures are described in detail below.

DESCRIPTION OF THE EMBODIMENTS

Figure 1:
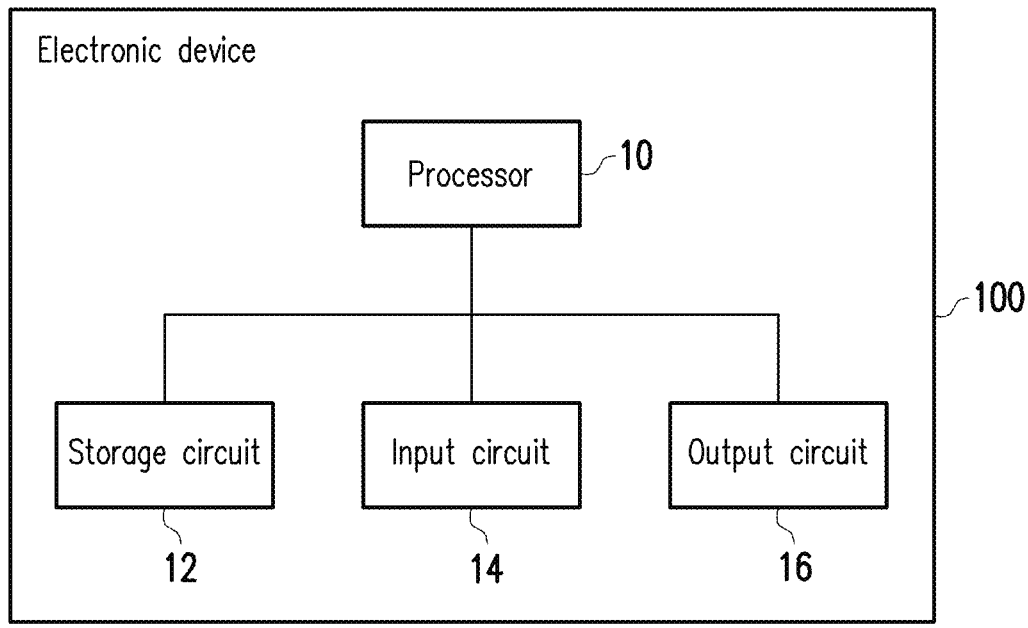
FIG. 1 is a schematic diagram of an electronic device according to an embodiment of the present invention.

Reference will now be made in detail to the exemplary embodiments of the present invention, examples of which are illustrated in the accompanying drawings. In addition, wherever possible, the same reference numbers are used in the drawings and the implementation methods to refer to the same or like parts.

FIG. 1 is a schematic diagram of an electronic device according to an embodiment of the present invention.

Referring to FIG. 1, an electronic device 100 of the present embodiment includes a processor 10, a storage circuit 12, an input circuit 14, and an output circuit 16, wherein the storage circuit 12, the input circuit 14, and the output circuit 16 are respectively coupled to the processor 10.

The processor 10 is a central processing unit (CPU), other programmable general-purpose or special-purpose microprocessors, a digital signal processor (DSP), a programmable controller, an application specific integrated circuit (ASIC), other similar elements, or a combination of the above elements.

The storage circuit 12 is any type of fixed or movable random access memory (RAM), read-only memory (ROM) and flash memory, similar elements, or a combination of the above elements.

The input circuit 14, for example, receives the input from a user through a keyboard, a mouse, a touch screen or a microphone.

The output circuit 16, for example, outputs a message or a signal through a screen, a loudspeaker or other output devices.

In the present exemplary embodiment, a plurality of program code fragments are stored in the storage circuit 12 of the electronic device 100. After the program code fragments in the storage circuit 12 are mounted, the program code fragments are executed by the processor 10 of the electronic device 100. For example, the storage circuit 12 includes a plurality of modules, and each operation in the electronic device 100 is respectively executed by the modules, wherein each module is composed of one or more program code fragments. However, the present invention is not limited thereto. Each operation of each electronic device in the electronic device 100 is also implemented by using other hardware forms.

Figure 2:
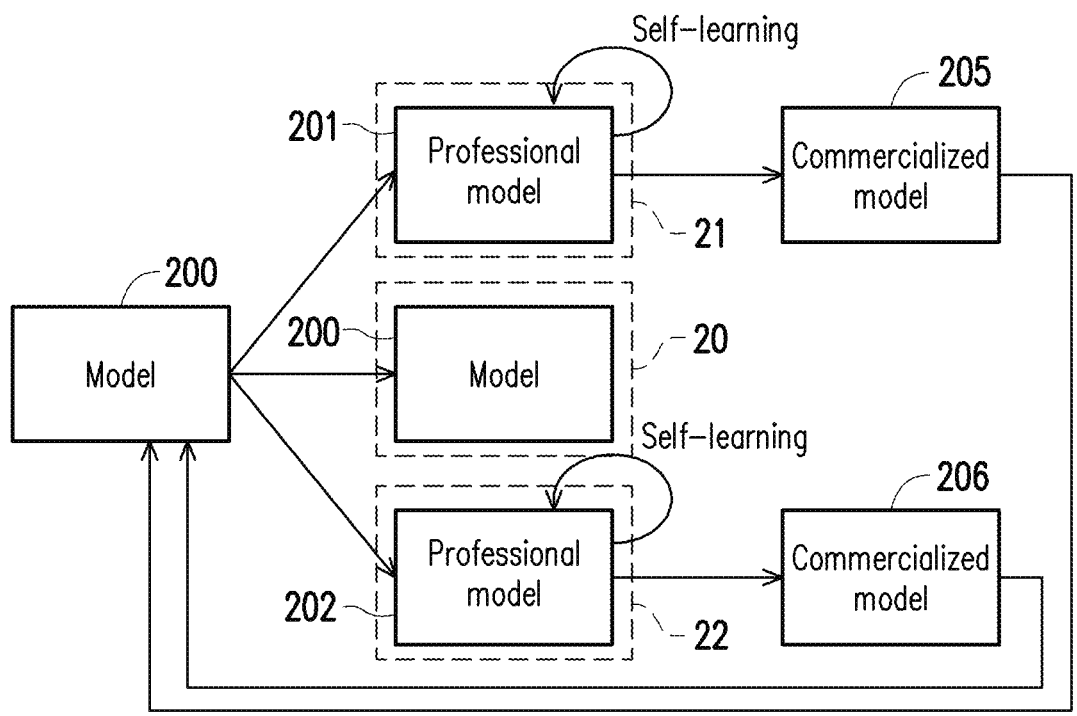
FIG. 2 is a schematic diagram of a model updating method of the present invention from a business perspective according to an embodiment of the present invention.

FIG. 2 is a schematic diagram of a model updating method of the present invention from a business perspective according to an embodiment of the present invention.

Referring to FIG. 2, when a model 200 for prediction is trained and is certified by a medical institution and commercialized, various conditions occur. For example, in terms of the medical industry, a medical institution 20 (for example, a clinic or a regional hospital) hopes to use the trained model 200. However, it is also possible that medical institutions 21-22 hope to have their own exclusive models, and hope the predicted result of the model 200 to be closer to the rules of the medical institutions 21-22. At this time, self-learning is joined to enable the models to be improved into exclusive professional models 201-202. In the future, if there is a commercialization demand, a commercialization process is entered to generate commercialized models 205 and 206.

Figure 3:
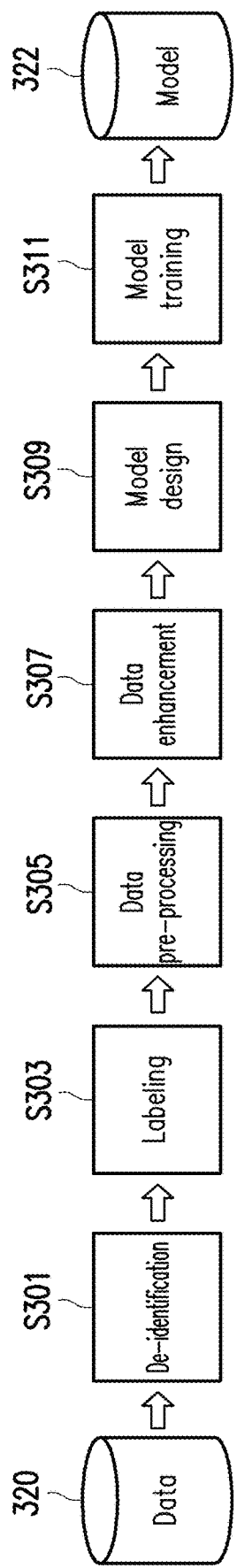
FIG. 3 is a schematic diagram of a model training method according to an embodiment of the present invention.

FIG. 3 is a schematic diagram of a model training method according to an embodiment of the present invention.

Referring to FIG. 3, in step S301, data 320 is de-identified. For example, de-identification is, for example, based on personal privacy protection, and the data 320 removes the information related to personal privacy. In step S303, the de-identified data is labeled, for example, the position of an object to be identified is selected. In step S305, the labeled data is pre-processed. In step S307, the pre-processed data is enhanced. It should be noted that the contents of both pre-processing and data enhancement are different according to different implementation modes, which will not be described herein. In step S309, the model design is performed, for example, models and algorithms for training are selected. In step S311, the data obtained in step S307 is used for training a model, and finally, a trained model 322 is generated.

Taking the medical industry as an example, the model 322 finally generated in FIG. 3 is used for identifying the location of a lesion in a medical image and selecting the location of the lesion.

Figure 4:
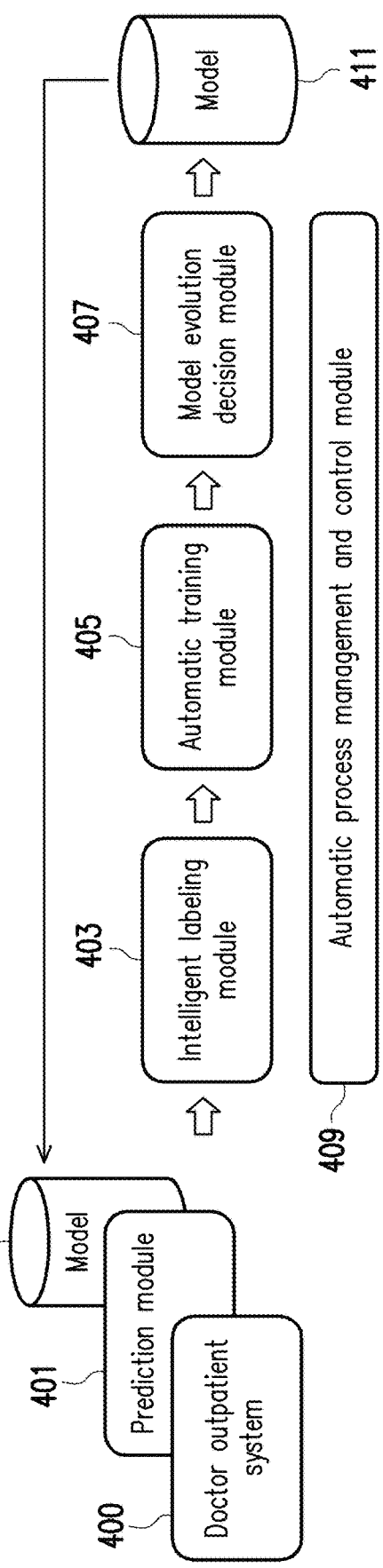
FIG. 4 is a schematic diagram of application of a model training method illustrated according to an embodiment of the present invention.

FIG. 4 is a schematic diagram of application of a model training method according to an embodiment of the present invention.

Referring to FIG. 4, the storage circuit 12 of the electronic device 100 includes a prediction module 401, an intelligent labeling module 403, an automatic training module 405, a model evolution decision module 407, and an automatic process management and control module 409. In a medical institution, a doctor uses a doctor outpatient system 400 to connect the prediction module 401 in series.

The prediction module 401 will use the model 322. When the doctor outpatient system 400 obtains a plurality of medical images of patients, the prediction module 401 inputs the medical images into the model 322 and outputs the predicted result of each medical image. Herein, the predicted result is, for example, the location of the lesion in the medical images. However, the present invention is not intended to limit the above predicted result.

In particular, when the predicted result of a part of images (hereinafter referred to as a first file) in the above medical images does not meet the expectation of the doctor, the doctor performs correction according to the predicted result input by the doctor outpatient system 400 (for example, the doctor manually selects the correct location of the lesion) to generate a corrected result (for example, a medical image in which the correct location of the lesion is selected by the doctor). Then, the intelligent labeling module 403, the automatic training module 405, the model evolution decision module 407, and the automatic process management and control module 409 are used for training the model according to the above corrected result to generate an evolutional model 411, and the model 411 is used for replacing the original model 322.

How to generate the evolutional model 411 through the intelligent labeling module 403, the automatic training module 405, the model evolution decision module 407, and the automatic process management and control module 409 is described below with more detailed embodiments.

Firstly, the intelligent labeling module 403 receives a corrected result for correcting the predicted result of the above first file, and generates a first label file corresponding to the first file according to the corrected result and the first file. For example, FIG. 5A and FIG. 5B are schematic diagrams for generating label files according to an embodiment of the present invention.

Figure 5A:
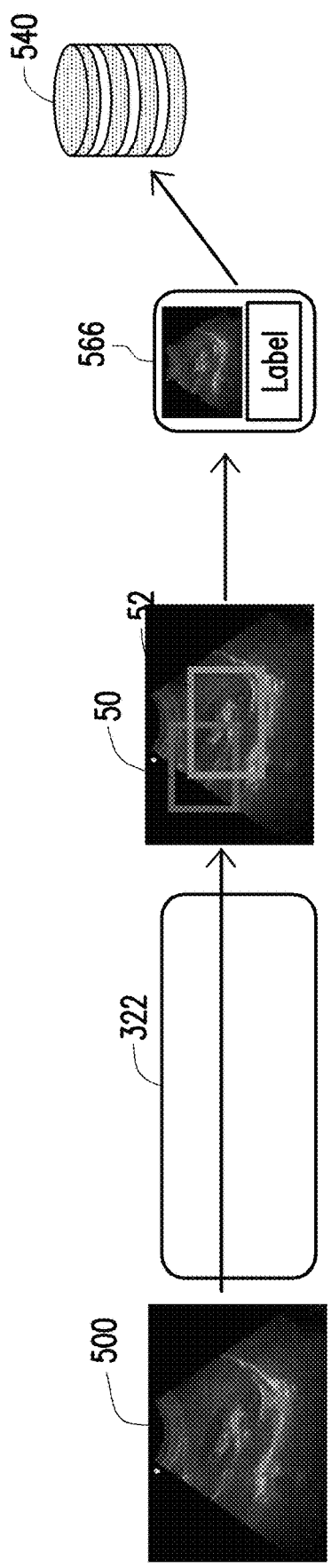
FIG. 5A and FIG. 5B are schematic diagrams for generating label files according to an embodiment of the present invention.

Referring to FIG. 5A, after a medical image 500 is input to the model 322, the output predicted result is a location 50 of a lesion in the image 500. For example, the doctor inputs a correct lesion location 52 in the image 500 through the doctor outpatient system 400. It should be noted that the location 52 is the above "corrected result". Then, the intelligent labeling module 403 generates a label file 566 (also referred to as a first label file) corresponding to the image 500 according to the corrected result (namely, the location 52) and the image 500. Then, the automatic process management and control module 409 stores the label file 566 in a database 540 and manages the label file 566 in the database 540.

It should be noted that in the embodiment of FIG. 5A, the intelligent labeling module 403 performs model training by only using the incorrectly predicted images. However, in other embodiments, it is also possible to perform model training by using both the correctly predicted images and the incorrectly predicted images.

Figure 5B:
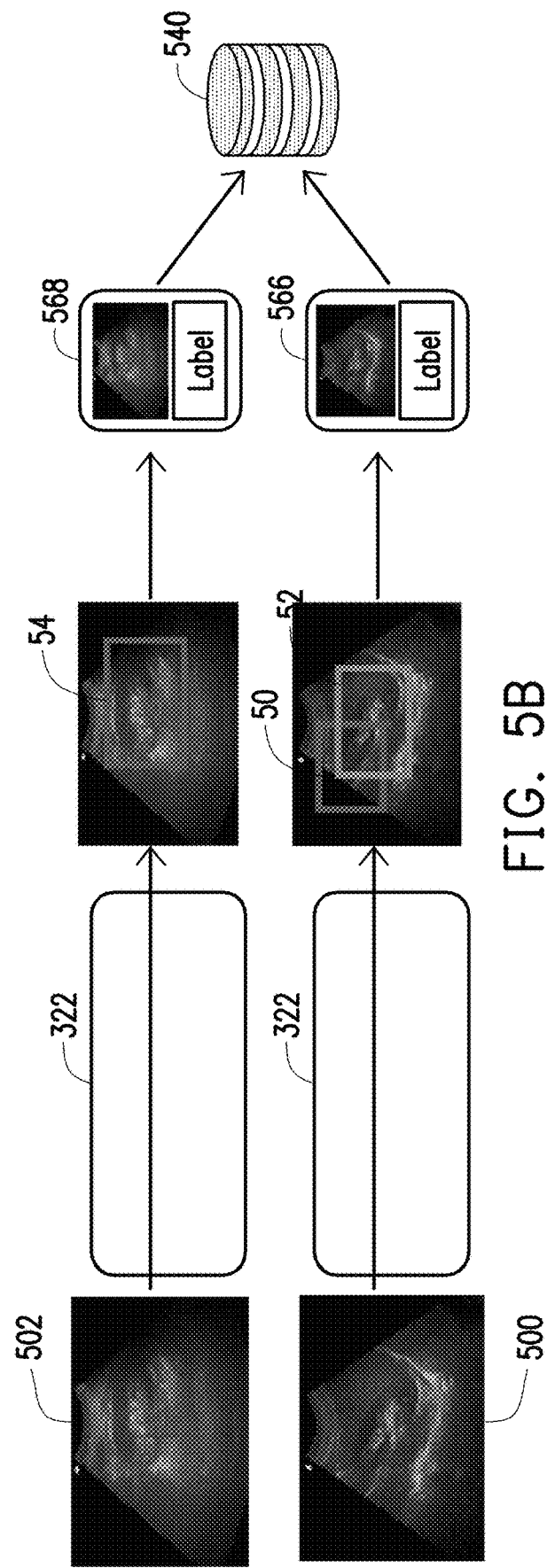

For example, referring to FIG. 5B, after a medical image 502 is input to the model 322, the output predicted result is a location 54 of a lesion in the image 502, and the location 54 is indeed the true location of the lesion. At this time, the doctor does not modify the predicted result of the image 502 but inputs a confirmation message through the doctor outpatient system. Then, the intelligent labeling module 403 does not receive the corrected result for correcting the predicted result of the image 502 (also referred to as a second file). The intelligent labeling module 403 generates a label file 568 (also referred to as a second label file) corresponding to the image 502 according to the predicted result (namely, the location 54) of the image 502. Then, the intelligent labeling module 403 stores the label file 568 in the database 540. Then, during subsequent model training of the automatic training module 405, the label file 568 and the label file 566 are simultaneously used for performing model training.

It should be noted that the label file is a text file, an Extensible Markup Language (XML) file, a JavaScript Object Notation (JSON) file or an Image Map, and is not limited thereto.

After the label files are generated, the automatic training module 405 trains a plurality of models according to the generated label files (for example, the first label file and/or the second label file) to generate a plurality of trained models.

Figure 6:
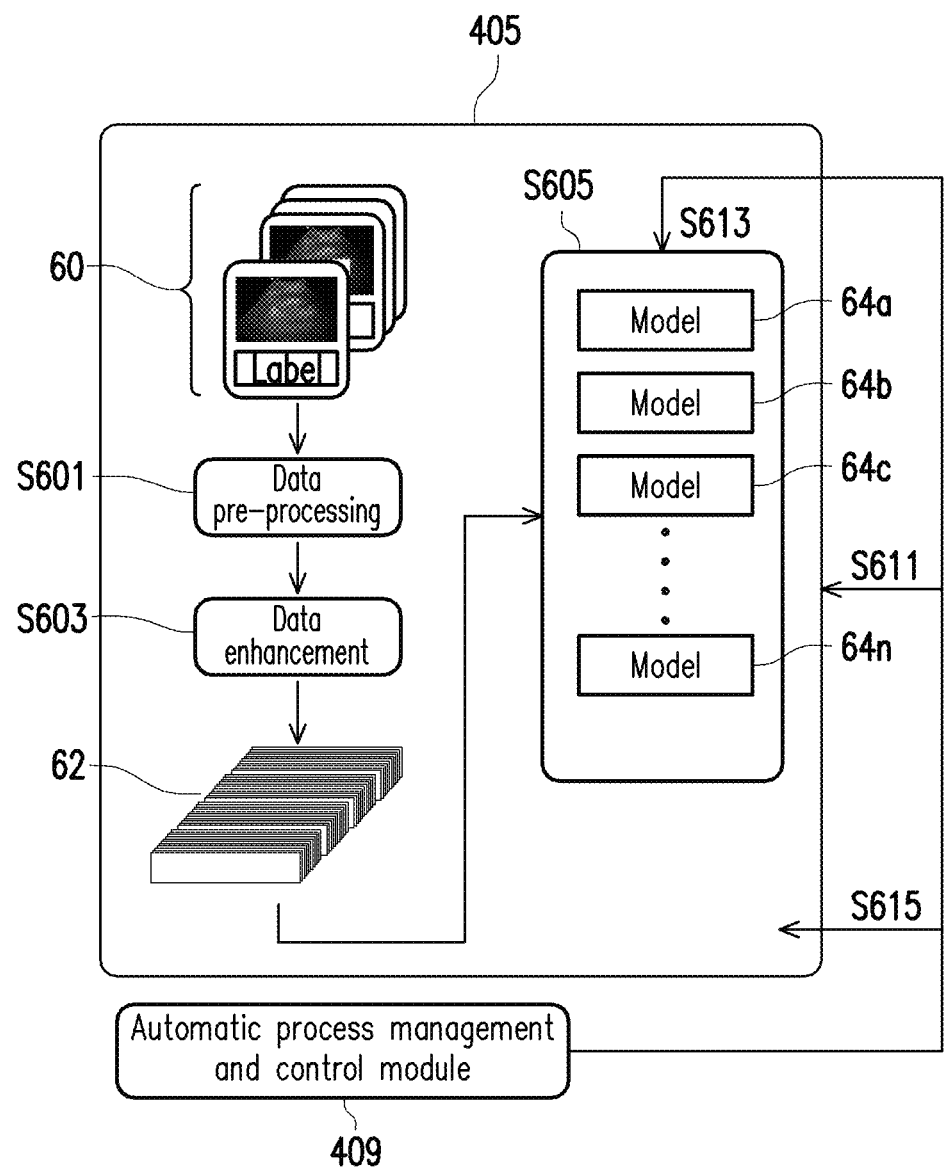
FIG. 6 is a schematic diagram of operation of an automatic training module according to an embodiment of the present invention.

In detail, FIG. 6 is a schematic diagram of operation of an automatic training module according to an embodiment of the present invention.

Referring to FIG. 6, it is assumed that a label file 60 is generated in the mode as shown in FIG. 5A or FIG. 5B. The automatic training module 405 performs a data pre-processing operation on the label file 60 in step S601 and performs a data enhancement operation in step S603, thereby finally generating labeled data 62 corresponding to the label file 60. It should be noted that both the data pre-processing operation and the data enhancement operation are used separately or together. For example, the data pre-processing operation converts the format of the labeled data 62 into an input format acceptable to the model. The data enhancement operation performs, for example, the normalized operation. However, the present invention is not intended to limit the actual contents of both the data pre-processing operation and the data enhancement operation.

After the labeled data 62 is obtained, the automatic training module 405 groups the labeled data 62 into a training set and a test set in proportion. For example, the training set contains 70% of all labeled data, and the remaining 30% of the labeled data is classified as the test set. The automatic training module 405 trains the models 64*a*-64*n* according to the training set generated by the labeled data 62 in step S605 to generate a plurality of trained models. It should be noted that the test set does not participate in model training and is used for preventing the training of the model from overfitting the training set.

It should be noted that the automatic process management and control module 409 automatically determines whether to execute the operation of training the models 64*a*-64*n* according to the label files (step S611). For example, only when the number of the label files is greater than a certain threshold value, the automatic process management and control module 409 determines to execute the operation of training the models 64*a*-64*n* according to the label files. The automatic process management and control module 409 also automatically selects the models 64*a*-64*n* to be used for training from a plurality of models with different architectures (step S613). The automatic process management and control module 409 also automatically determines a schedule and a time for executing the operation of training the models 64*a*-64*n* according to the label files (step S615). For example, the automatic process management and control module 409 sets the schedule and the time for executing the operation of training the models 64*a*-64*n* according to the label files when the doctor is absent.

After the training of the models 64*a*-64*n* is completed, the trained models need to be tested. For example, FIG. 7A and FIG. 7B are schematic diagrams of operation of a model evolution decision module according to an embodiment of the present invention.

Figure 7A:
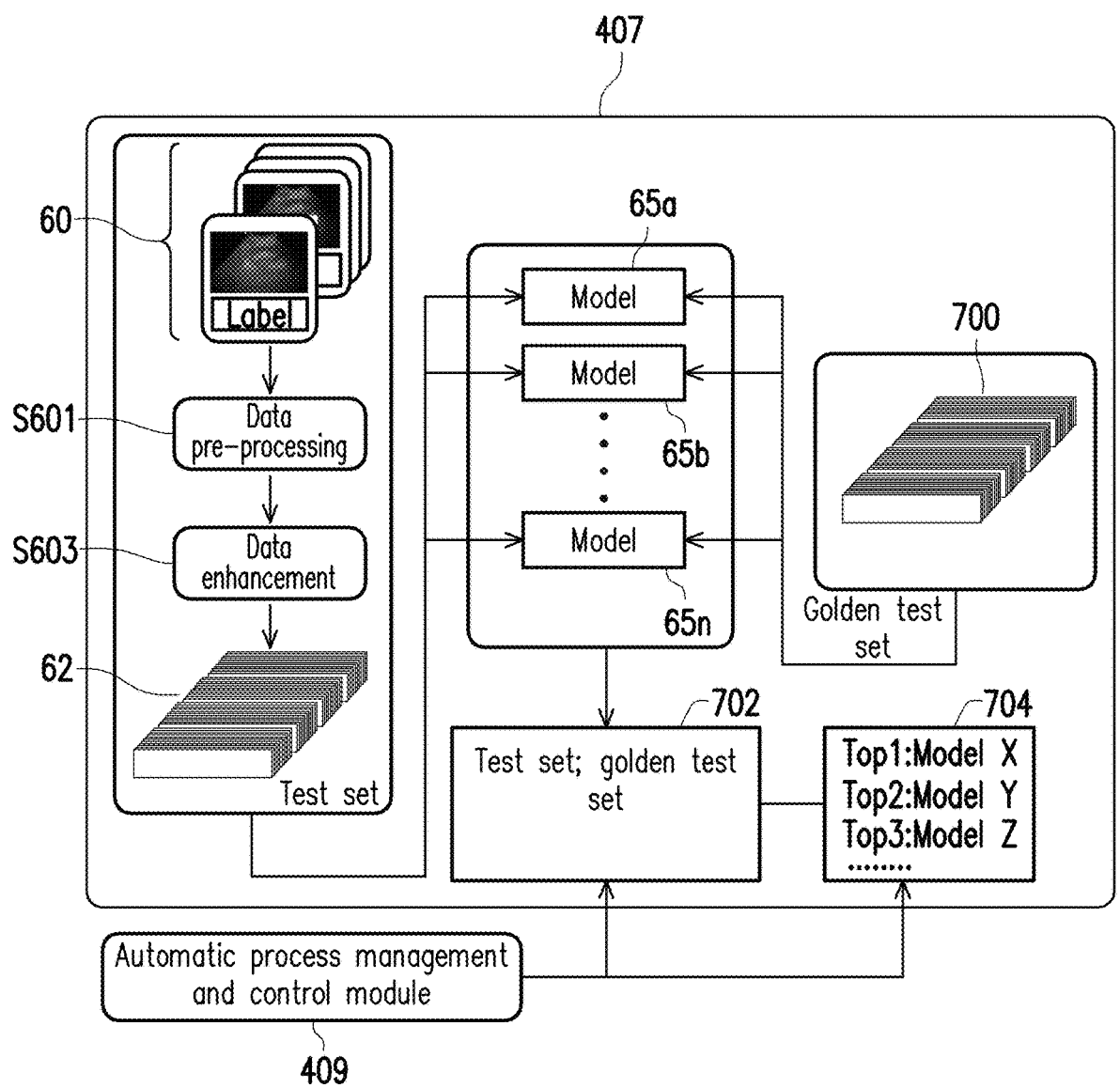
FIG. 7A and FIG. 7B are schematic diagrams of operation of a model evolution decision module according to an embodiment of the present invention.
Figure 7B:
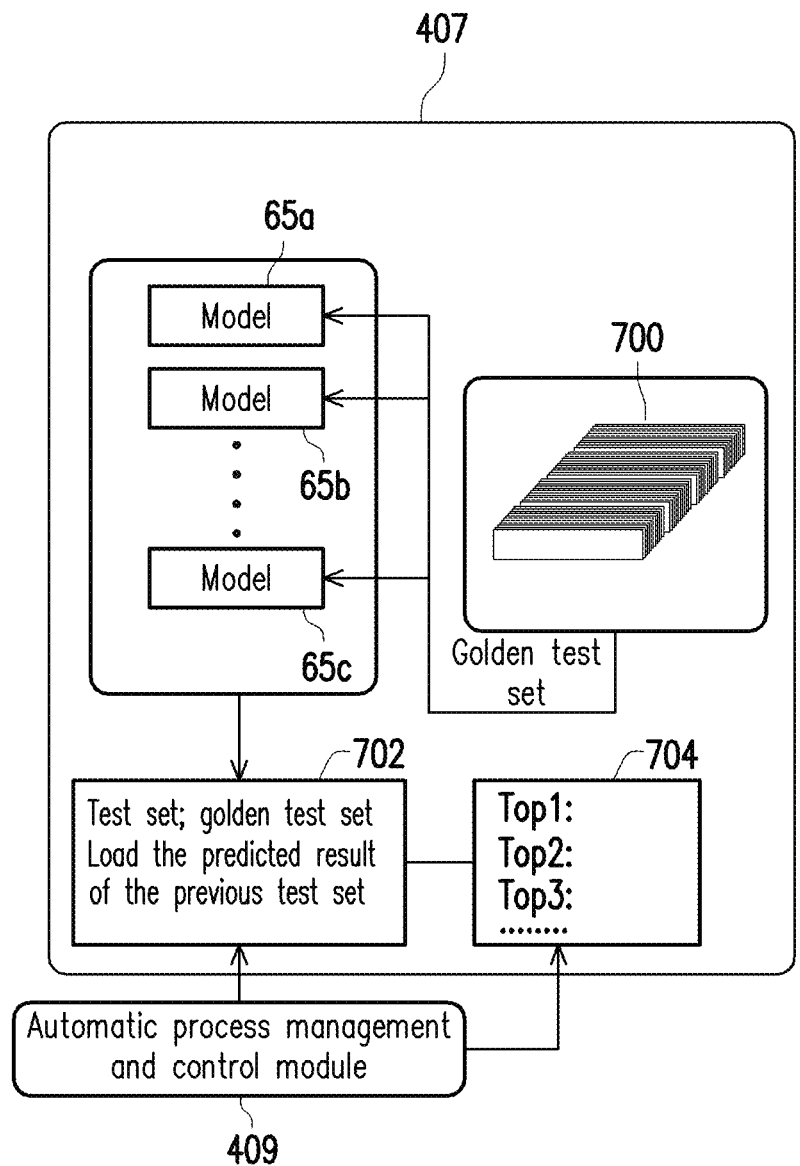

Referring to FIG. 7A, it is assumed that trained models 65*a*-65*n* are obtained after the models 64*a*-64*n* are trained. The model evolution decision module 407 tests the models 65*a*-65*n* by using the test set generated in FIG. 6. In the present embodiment, the model evolution decision module 407 also tests the models 65*a*-65*n* by using other test sets. For example, the model evolution decision module 407 tests the models 65*a*-65*n* by using a golden test set 700. The golden test set 700 includes multi-party verified, objective, just and undisputed contents, and also includes a plurality of labeled data. The golden test set 700 is used for testing whether the models 65*a*-65*n* overfit the test set and the training set generated in FIG. 6 and thus the basic predicting accuracy of the models 65*a*-65*n* is reduced.

Then, the model evolution decision module 407 records the test results of the models 65*a*-65*n* in a list 702. The model evolution decision module 407 calculates and outputs a ranking 704 of the models 65*a*-65*n* according to the test results in the list 702. The ranking 704 is used for representing the priority of the models 65a-65n used to replace the original model 322.

Then, the automatic process management and control module 409 determines whether to update the original model 322 according to the ranking 704. For example, when the predicting accuracy of one (also referred to as the first trained model) of the trained models 65a-65n is higher than the predicting accuracy of the model 322 and/or when the first trained model is first in the ranking 704, the automatic process management and control module 409 replaces the model 322 with the first trained model.

In particular, if the predicted results of the trained models 65a-65n are not satisfactory, the model evolution decision module 407 also suggests not to update (or replace) the original model 322. In addition, in the present embodiment, the automatic process management and control module 409 also determines whether to execute the operation of testing the models 65a-65n by using the test set. For example, when the data in the test set obtained from the flow of FIG. 6 is insufficient, the operation of testing the models 65a-65n is not executed first.

Furthermore, referring to FIG. 7B, in an embodiment, if the test set generated in FIG. 6 is input into the trained models 65a-65n in the operation flow of the automatic training module 405 of FIG. 6 and the obtained predicted results are stored, the model evolution decision module 407 omits the step of testing in FIG. 7A by using the test set generated in FIG. 6 and tests the models 65a-65n by only using the golden test set, as shown in FIG. 7B.

In particular, the automatic process management and control module 409 cooperates with other modules, and connects the operations of all modules in series from label storage and management of the intelligent labeling module 403 in the first stage to model and/or parameter selection of the automatic training module 405 in the second stage to model capability evaluation and updating decision of the model evolution decision module 407 in the third stage. After a user, for example, sets the decision of the automatic process management and control module 409 on an operation interface (not shown), each module automatically executes and determines whether to update the original model 322. Therefore, in the medical field, an intelligent medical system with adaptive learning is achieved.

Figure 8:
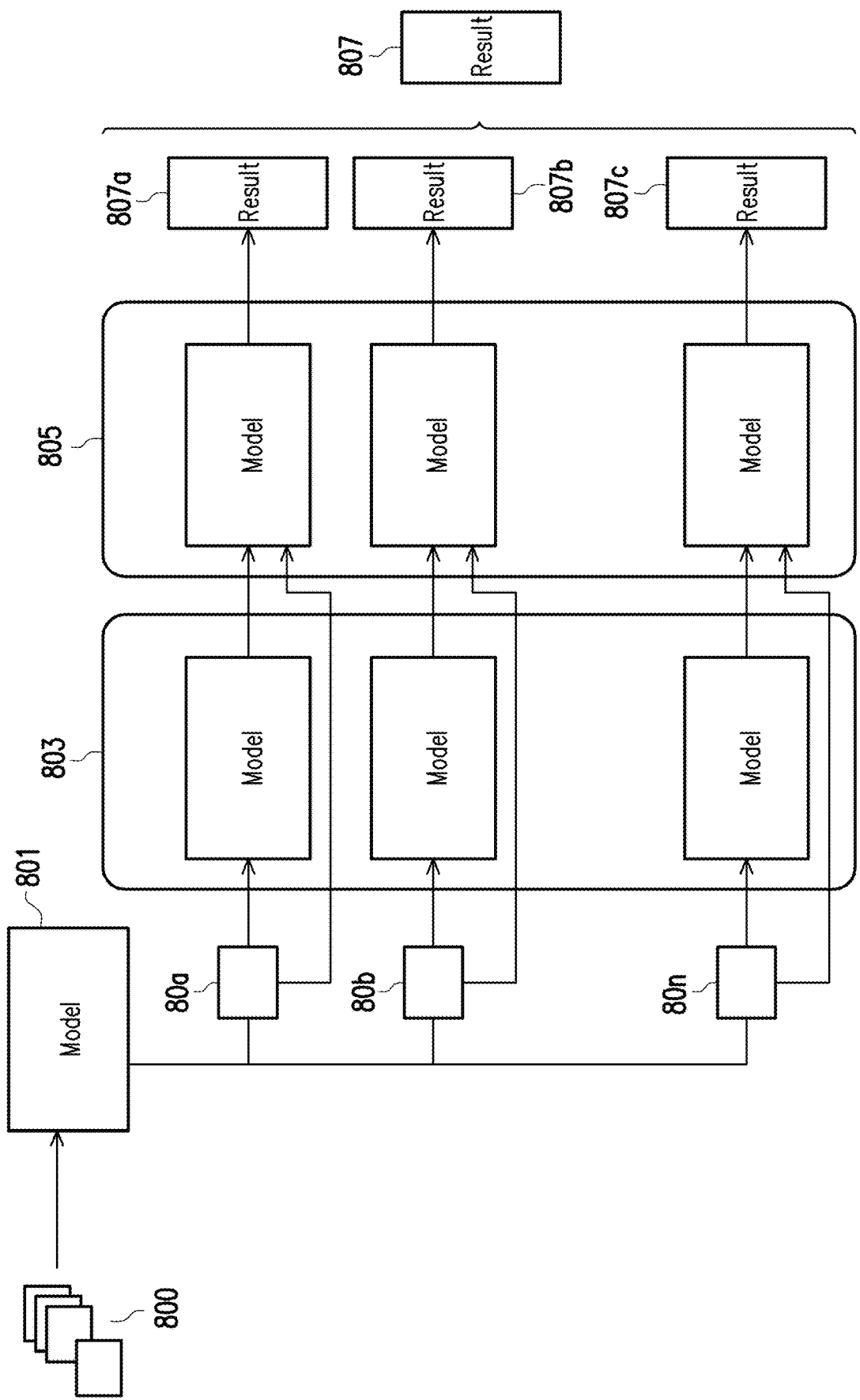
FIG. 8 is a schematic diagram of simultaneous use of a plurality of models according to an embodiment of the present invention.

FIG. 8 is a schematic diagram of simultaneous use of a plurality of models according to an embodiment of the present invention. Referring to FIG. 8, generally speaking, a deep learning module is an end-to-end model. In the medical field, some diagnostic processes are complicated, and direct application of a single model for prediction tends to make the model difficult to train successfully. Taking the process of calculating the degree of vascular occlusion to provide a doctor's treatment suggestion for example, a film 800 is obtained by angiography, and frames 80a-80n participating in calculation are selected from the film 800 through a model 801. Subsequently, blood vessels in the frames 80a-80n are divided into a trunk, a branch and a tail end through a model 803, then, a model 805 is used for determining whether there are obstructions or other foci in each part of the blood vessels to generate judging results 807a-807c, and finally, the judging results 807a-807c are integrated into a summarized result 807 to be output. In other words, three models with different functions are simultaneously used in FIG. 8. The input of one model is the output of the previous model, and the present invention also trains a plurality of models in a pipeline mode.

Figure 9:
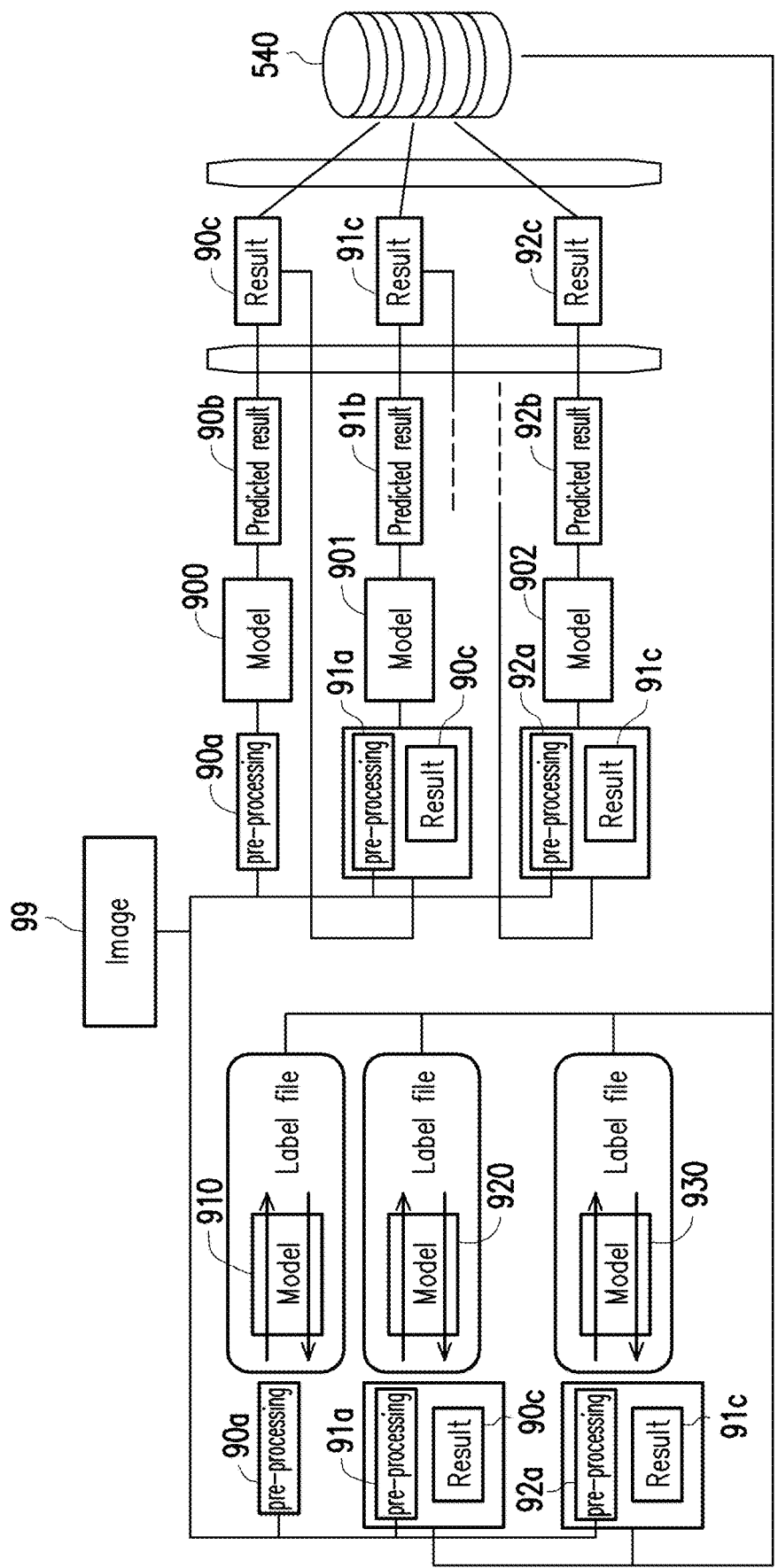
FIG. 9 is a schematic diagram of training a plurality of models by using a pipeline mode according to an embodiment of the present invention.

FIG. 9 is a schematic diagram of training a plurality of models by using a pipeline mode according to an embodiment of the present invention. Referring to FIG. 9, the prediction module 401 performs a pre-processing operation 90a on an image 99, inputs the pre-processed image 99 to a model 900, and outputs a predicted result 90b. If the predicted result 90b does not meet the expectation of the doctor (for example, the predicted result is incorrect), the doctor, for example, corrects the predicted result 90b through a human-computer interaction interface, and the intelligent labeling module 403 receives a corrected result 90c for correcting the predicted result of the image 99, generates a label file corresponding to the image 99 according to the corrected result 90c and the image 99, and stores the label file in a database 540.

After the corrected result 90c is obtained, the intelligent labeling module 403 also inputs the corrected result 90c and the image 99 after the pre-processing 91a to a model 901 (also referred to as a second model). The model 901 outputs the predicted result 91b corresponding to the image 99 according to the corrected result 90c and the image 99. If the predicted result 91b does not meet the expectation of the doctor (for example, the predicted result is incorrect), the doctor, for example, corrects the predicted result 91b through the human-computer interaction interface. The intelligent labeling module 403 also receives the corrected result 91c for correcting the predicted result 91b, generates a label file (also referred to as a third label file) corresponding to the image 99 according to the corrected result 91c and the image 99, and stores the label file in the database 540. Similar flows are applied to obtain a predicted result 92b and a corrected result 92c by using a model 902.

For training of the model, the automatic training module 405 trains a model 910 by using the image 99 after the pre-processing operation 90a and the label file corresponding to the corrected result 90c. Similarly, the automatic training module 405 trains a model 920 according to the input of the model 901 (namely, the file obtained by the pre-processing of the corrected result 90c and the image 99) and the above third label file. The training of the model 930 is the same as the training of the models 910-920, and is not described herein.

Then, the model evolution decision module 407 is used for testing the trained models 910-930, and the automatic process management and control module 409 is used for determining whether to replace the model 900 with the model 910, replace the model 901 with the model 920, and replace the model 902 with the model 930.

It should be noted that although the above examples use an image as input, the present invention is not limited thereto. In other embodiments, the input files are also other types of files.

Figure 10:
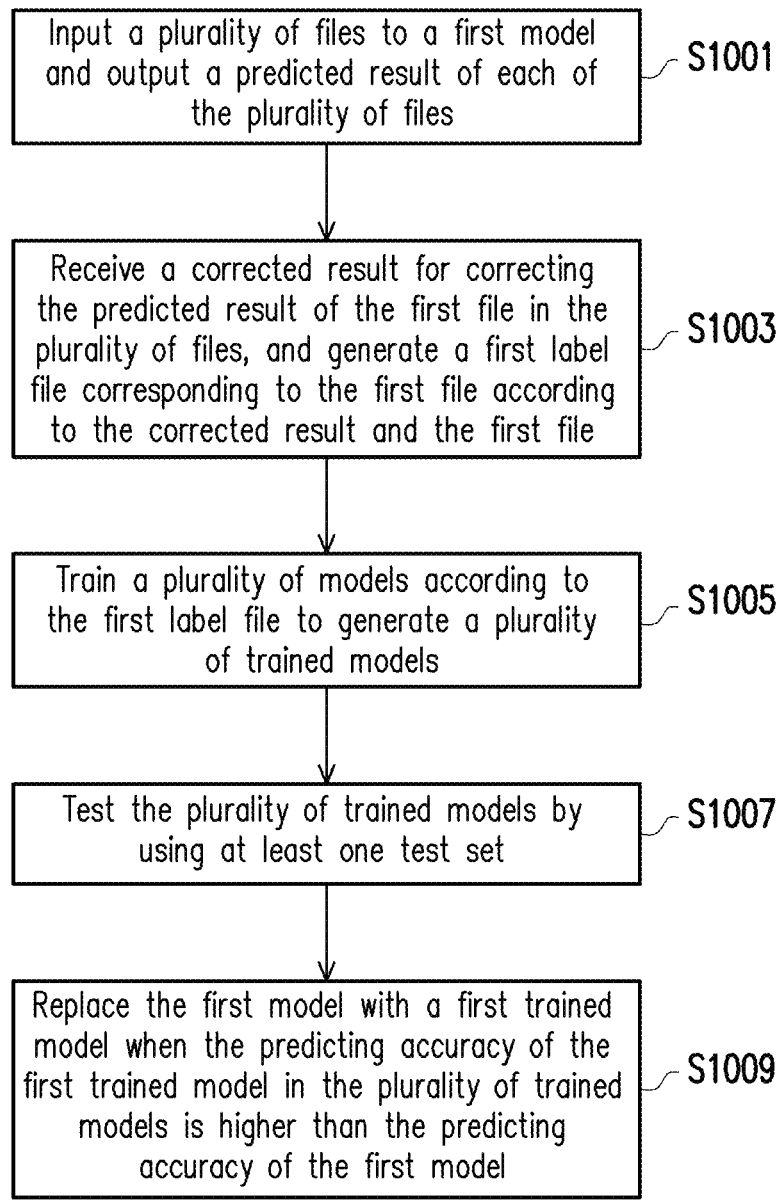
FIG. 10 is a flow diagram of a model updating method according to an embodiment of the present invention.

FIG. 10 is a flow diagram of a model updating method according to an embodiment of the present invention.

Referring to FIG. 10, in step S1001, the prediction module 401 inputs a plurality of files to the first model and outputs the predicted result of each of the plurality of files. In step S1003, the intelligent labeling module 403 receives a corrected result for correcting the predicted result of the first file in the plurality of files, and generates a first label file corresponding to the first file according to the corrected result and the first file. In step S1005, the automatic training module 405 trains a plurality of models according to the first label file to generate a plurality of trained models. In step S1007, the model evolution decision module 407 tests the plurality of trained models by using at least one test set. Finally, in step S1009, the automatic process management and control module 409 replaces the first model with a first trained model when the predicting accuracy of the first trained model in the plurality of trained models is higher than the predicting accuracy of the first model.

In conclusion, the electronic device and the model updating method of the present invention self-adjust or train a model when the prediction of the model does not meet the expectation so as to enable the predicted behavior of the model to approach the expectation to be achieved, thereby increasing the willingness of the user to accept the used model (or system). On the other hand, if the user thinks that the prediction effect of the original model or system is good, or if the prediction effect of the model or system does not change with time, the user is allowed to turn off the update of the model. In addition, if some predicted behaviors are divided into a plurality of steps and the steps are combined by respectively using a plurality of models, respective models are also learned and trained respectively. The user selects a part of the models for self-training. In addition, in the model updating method of the present invention, the training time of the model is also scheduled, thereby avoiding the time for the user (for example, a doctor) to use the system, and performing self-training of the model during the non-business time (at night or when the doctor is absent). Therefore, the model updating method of the present invention not only joins the mechanism of self-learning of the model, but also includes user management and control and scheduling.

Although the present invention has been disclosed above by way of embodiments, it is not intended to limit the present invention. Any person having ordinary knowledge in the art can make some changes and refinements without departing from the spirit or scope of the present invention. Therefore, the protection scope of the present invention is defined by the scope of the appended claims.

What is claimed is:

1. An electronic device, comprising:
   a storage circuit for recording a plurality of modules;
   a processor for accessing and executing the plurality of modules, wherein the plurality of modules comprises:
      a prediction module for inputting a plurality of files to a first model and outputting a predicted result of each of the plurality of files;
      an intelligent labeling module for receiving a corrected result for correcting the predicted result of at least one first file in the plurality of files, and generating a first label file corresponding to the first file according to the corrected result and the first file;
      an automatic training module for training a plurality of models according to the first label file to generate a plurality of trained models;
      a model evolution decision module for testing the plurality of trained models by using at least one test set; and
      an automatic process management and control module for replacing the first model with a first trained model when the predicting accuracy of the first trained model in the plurality of trained models is higher than the predicting accuracy of the first model.

2. The electronic device according to claim 1, wherein
   the automatic process management and control module manages and stores the first label file,
   the automatic process management and control module determines whether to execute the operation of training the plurality of models according to the first label file,
   the automatic process management and control module selects the plurality of models to be trained,
   the automatic process management and control module determines a schedule and a time for executing the operation of training the plurality of models according to the first label file, and
   the automatic process management and control module determines whether to execute the operation of testing the plurality of trained models by using the test set.

3. The electronic device according to claim 1, wherein
   the intelligent labeling module does not receive another corrected result for correcting the predicted result of at least one second file in the plurality of files, and generates a second label file corresponding to the second file according to the predicted result of the second file, and
   the automatic training module trains the plurality of models according to the second label file to generate the plurality of trained models.

4. The electronic device according to claim 1, wherein in the operation of training the plurality of models according to the first label file to generate the plurality of trained models,
   the automatic training module executes a data pre-processing operation and/or a data enhancement operation on the first label file to generate labeled data corresponding to the first label file, and
   the automatic training module trains the plurality of models according to the labeled data to generate the plurality of trained models.

5. The electronic device according to claim 4, wherein in the operation of training the plurality of models according to the labeled data to generate the plurality of trained models,
   the automatic training module trains the plurality of models by using a part of the labeled data to generate the plurality of trained models.

6. The electronic device according to claim 5, wherein in the operation of testing the plurality of trained models by using the test set,
   the model evolution decision module tests the plurality of trained models by using another part of the labeled data.

7. The electronic device according to claim 1, wherein the test set comprises a golden test set, and the golden test set comprises a plurality of verified labeled data.

8. The electronic device according to claim 1, wherein
   the model evolution decision module outputs a ranking of the plurality of models, and the ranking is used for representing the priority of the plurality of models used to replace the first model.

9. The electronic device according to claim 1, wherein
   the intelligent labeling module inputs the corrected result and the first file to a second model, the second model outputs another predicted result corresponding to the first file according to the corrected result and the first file,
   the intelligent labeling module receives another corrected result for correcting another predicted result, and generates a third label file corresponding to the first file according to another corrected result and the first file, and
   the automatic training module trains another model according to the third label file, the corrected result and the first file.

10. A model updating method for an electronic device, comprising:
    inputting a plurality of files to a first model and outputting a predicted result of each of the plurality of files;

receiving a corrected result for correcting the predicted result of at least one first file in the plurality of files, and generating a first label file corresponding to the first file according to the corrected result and the first file;

training a plurality of models according to the first label file to generate a plurality of trained models;

testing the plurality of trained models by using at least one test set; and replacing the first model with a first trained model when the predicting accuracy of the first trained model in the plurality of trained models is higher than the predicting accuracy of the first model.

* * * * *